3,062,706
**METHOD OF DESTROYING FUNGI EMPLOYING
1-CHLORO-2,4,6-TRINITROBENZENE**
Gustave K. Kohn, Berkeley, Calif., assignor to California Research Corporation, San Francisco, Calif., a corporation of Delaware
No Drawing. Filed Oct. 17, 1956, Ser. No. 616,361
2 Claims. (Cl. 167—30)

This invention relates to the production and application of unique fungicidal and bactericidal compositions containing 1-chloro-2,4,6-trinitrobenzene as an active component.

It has been discovered that 1-chloro-2,4,6-trinitrobenzene possesses an unexpected high degree of biological activity with particular reference to its activity as a fungicide and bactericide against known plant pathogens. The further characterisic of relatively low degree of phytotoxicity permits the application of its biological activity in a variety of environments. Thus, the compound of the invention may be applied, in suitable formulations, for soil treatment, seed treatment, and foliage application for the protection of materials susceptible at attack by a variety of organisms.

The biologically active 1-chloro-2,4,6-trinitrobenzene exists as a yellow crystalline solid with a melting point at about 80° C. and may be formulated and applied in either solid or liquid form by admixture with suitable inert solid or liquid carriers in conjunction with emulsifying and/or dispersing agents.

The preparation of this compound may follow any of the conventional methods of preparation, and for purposes of illustration the following example is presented.

A total of 458.2 grams (1.0 mole) of picric acid was dissolved in 4 liters of hot 95% ethanol and 158.2 grams (1.0 mole) pyridine were added. The pyridine picrate was collected on cooling and air dried. The yield was 564 grams (91.5% of theory).

This salt (1.83 moles) was added to 500 milliliters of benzene and 188.0 grams of phosphorus oxychloride and refluxed for 15 to 20 minutes. The benzene phase and the oil phase were separated and each given a thorough wash with hot water. On combination and evaporation of benzene, 1-chloro-2,4,6-trinitrobenzene (picryl chloride) was isolated. The yield was 366.7 grams (81.2% of theory). The product melted at 79° to 82° C.

In preparing or formulating this compound for application as a fungicide or bactericide, the compound is preferably presented in the form of dust compositions, wettable powders, or emulsives.

As a dust, the compound may be used either undiluted or dispersed in a powdered solid carrier such as talc, soapstone, frianite, pyrophyllite, Attapulgus clay, as well as other finely diveded solid carriers known in the dusting art, which are preferably of large surface area. The dusting formulations may contain from 1 to 90% of the subject compound as the active ingredient and may be employed in combination with other compatible active toxicants.

When formulated as a wettable powder, the active component may be employed in conjunction with inert fillers which may be either the clay-type carrier or non-clay-type carrier, as well as combinations thereof, in conjunction with various combinations of dispersing agents and emulsifiers which permit the adaptation of the concentrate as a free-flowing powder for aqueous dilution to field concentrations. The wettable powders may normally contain between 10 and 90% of the active ingredient.

In preparing emulsion concentrates or so-called "emulsives," the active component is formulated and dissolved in an oil base which may be either mineral or vegetable oil, as for example corn oil, kerosene, or an aromatic distillate solvent, in conjunction with one or more surfactants which permit application as a stable emulsion in aqueous media at field dilution. Generally, the active ingredient is formulated in emulsives at concentrations between 5 and 25% by weight of active ingredient.

The compound of the invention possesses unique biological activity and adaptability for three major fields of fungicidal and bactericidal application, namely, in the treatment of soil, seeds, or foliage, all or any of which may be invaded by a diversity of fungi and bacteria, or which may serve as the hosts medium for sporulation by such plant pathogens.

As an illustration of the unique fungicidal and bactericidal properties of 1-chloro-2,4,6-trinitrobenzene, the following test results are presented and compared with results obtained with compounds of similar chemical structure. The fungicidal data were obtained by the test procedure wherein filter paper discs were infused for 24 hours in a 60-hour-old shake culture of *Alternaria brassicae, Fusarium oxysporum* f. *phaseoli, Pythium ultimum, Rhizoctonia solani, Sclerotinia, sclerotiorum, Streptomyces scabies, Phytophthora erythroseptica, Aspergillus niger, Botrytis cinerea, Cercospora apii, Stemphylium botryosum, Penicillium italicum, Monilinia fructicola,* and *Phytophthora cinnamomi,* after which they were transferred in triplicate to Petri dishes containing standard potato dextrose agar. The plates were placed on a turntable and sprayed, with the test solution of the compounds dissolved in a 1:1 kerosene-acetone solvent, in an Eastburg-McCaskey spray tower at 40 p.s.i. for 25 to 30 seconds. The exposed plates remained on the turntable for 1 minute after the spray application to allow the mist to settle. The plates then were incubated several days at optimum temperatures, after which the average radius of growth was measured with four measurements of each colony being made. The results obtained and tabulated in the following table represent the average degree of growth inhibition over the control culture sprayed only with the solvent.

For the bactericidal screening, 1 milliliter of a suspension of each test bacterium was added to sufficient Emerson's broth in vials to provide a 1:100 dilution following the addition of an acetone solution of the test compound at the desired dilution. The test organisms include *Pseudomonas caryophylli, Xanthomonas phaseoli, Agrobacterium tumefaciens,* and *Corynebacterium michiganense.* Following incubation at optimum temperatures, bacteriostatic activity was determined by the absence of turbidity in the solution. Serial transfers later demonstrated bactericidal activity.

| | Percent concentration | Fungi | | | | | | | | | | | | | | Bacteria, min. p.p.m. for control | | | |
|---|---|---|---|---|---|---|---|---|---|---|---|---|---|---|---|---|---|---|---|
| | | *A. brassicae* | *F. phaseoli* | *P. ultimum* | *R. solani* | *S. sclerotiorum* | *S. scabies* | *P. erythroseptica* | *A. niger* | *B. cinerea* | *C. apii* | *S. botryosum* | *P. italicum* | *M. fructicola* | *P. cinnamomi* | Pseudomonas | Xanthomonas | Agrobacterium | Corynebacterium |
| 1-chloro-2,4,6-trinitrobenzene | .25 | 100 | 100 | 100 | 92 | 99 | 82 | 100 | 100 | 97 | 77 | 100 | 100 | 99 | 100 | 25 | 5 | 5 | 5 |
| 1,2,4-trichloro-3,5-dinitrobenzene | .25 | 44 | 66 | 64 | 82 | 92 | 96 | 91 | 67 | 86 | 66 | 31 | 99 | 95 | 85 | | | | |
| 1,2,4,5-tetrachloro-3,6-dinitrobenzene | .25 | 48 | 28 | 0 | 0 | 33 | 51 | 36 | 90 | 91 | 42 | 60 | 84 | 84 | 9 | >100 | >100 | >100 | 100 |
| Pentachloronitrobenzene | .25 | 50 | 18 | 23 | 45 | 16 | 39 | 13 | 61 | 66 | 19 | 27 | 72 | 74 | 0 | >100 | >100 | >100 | 25 |

Obviously, many modifications and variations of the invention as hereinbefore set forth may be made without departing from the spirit and scope thereof, and therefore only such limitations should be imposed as are indicated in the appended claims.

I claim:
1. A method of inhibiting the sporulation of fungi which comprises contacting said fungi with 1-chloro-2,4,6-trinitrobenzene.
2. A method of protecting a material susceptible to attack by fungi which comprises contacting said susceptible material with 1-chloro-2,4,6-trinitrobenzene.

References Cited in the file of this patent

UNITED STATES PATENTS

| | | |
|---|---|---|
| 1,907,493 | Britton | May 9, 1933 |
| 1,947,926 | Steindorff | Feb. 20, 1934 |
| 2,293,034 | Moore | Aug. 18, 1942 |
| 2,293,463 | Hechenberkner | Aug. 18, 1942 |
| 2,304,821 | Hausen | Dec. 15, 1942 |
| 2,721,160 | Newcomer | Oct. 18, 1955 |
| 2,722,497 | Newcomer | Nov. 1, 1955 |
| 2,772,260 | Yeager | Nov. 27, 1956 |
| 2,779,680 | Wolf | Jan. 29, 1957 |
| 2,786,795 | Ligett | Mar. 26, 1957 |
| 2,815,365 | Senkbeil | Dec. 3, 1957 |
| 2,815,367 | Senkbeil | Dec. 3, 1957 |
| 2,823,224 | Senkbeil | Feb. 11, 1958 |
| 2,823,225 | Senkbeil | Feb. 11, 1958 |

OTHER REFERENCES

Frear: A Catalogue of Insecticides and Fungicides, Chromica Botanica Comp., 1948, page 49, vol. I.

King: Agriculture Handbook, No. 69, U.S.D.A., 1954, page 67.

Chem. Abs., vol. 26, page 2722 (3); vol. 32, page 5799 (1); vol. 36, page 5815 (8).

Frear: A Catalogue of Insecticides and Fungicides, Chromica Botanica Comp., 1947, vol. I, page 46.

Frear: Chemistry of Insecticides, Fungicides and Herbicides, 2nd ed., 1948, D. Van Nostrand Comp., pp. 280–287.